UNITED STATES PATENT OFFICE.

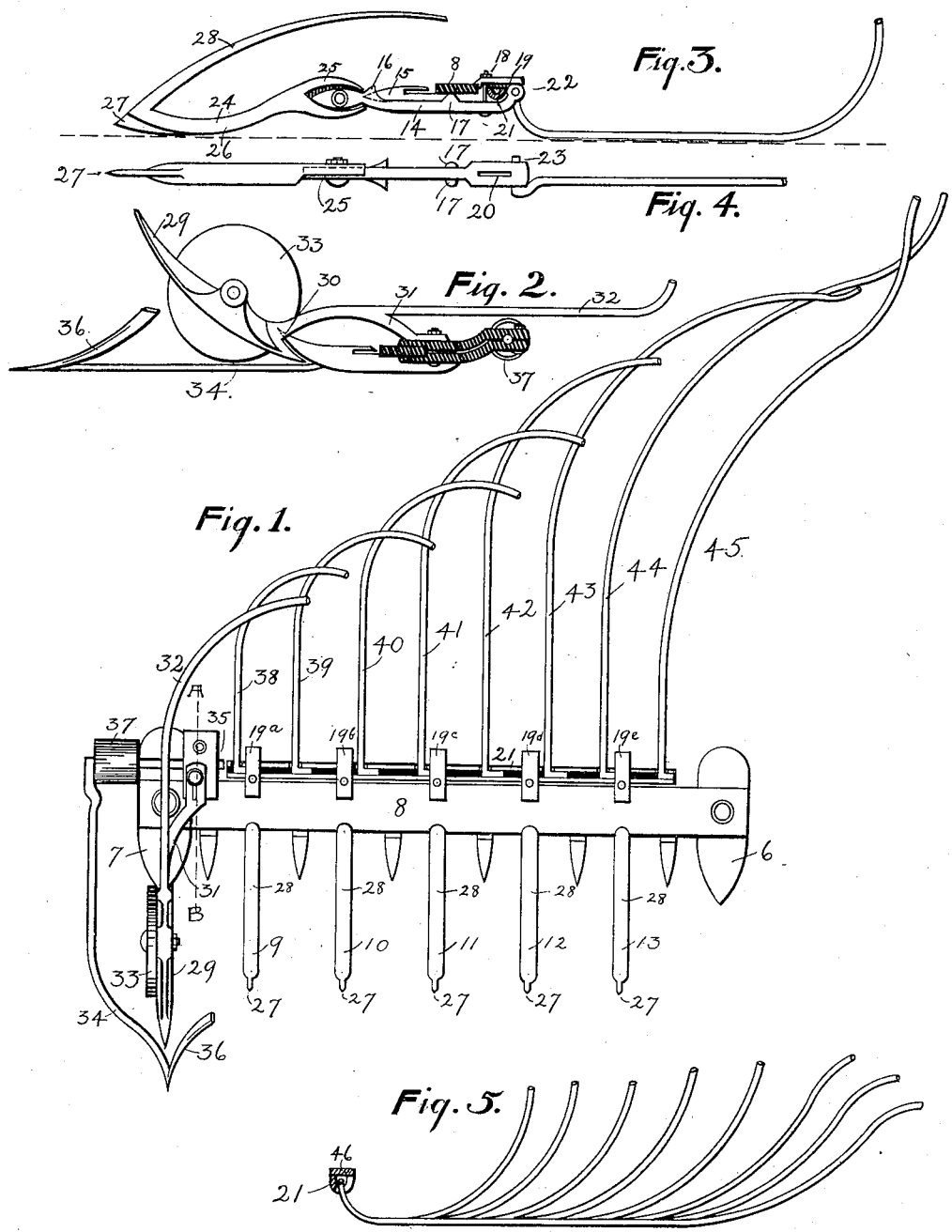

WILLIAM GATERMAN, OF NEWTON, WISCONSIN.

MOWER ATTACHMENT.

SPECIFICATION forming part of Letters Patent No. 627,931, dated June 27, 1899.

Application filed January 13, 1897. Serial No. 619,102. (No model.)

*To all whom it may concern:*

Be it known that I, WILLIAM GATERMAN, a citizen of the United States, residing at Newton, in the county of Manitowoc and State of Wisconsin, have invented certain new and useful Improvements in Attachments for the Finger-Bars of Mowers and Harvesters, of which the following is a full, clear, and exact description.

The object of my invention is to provide for the harvesting of peas or other entangled vined growths or lodged grain with an ordinary mowing-machine; and it consists in certain peculiar devices attachable to the finger-bar of such a machine and designed for the purpose of severing the vines from the ground and at the same time separating a swath from the entangled mass in the field and removing the same out of the way of the draft-animals and wheels of the machine for the following trip or round, the construction and relative arrangement of the said devices being hereinafter more fully described, set out, and claimed, reference being had to the accompanying drawings, in which—

Figure 1 represents a top view of a finger-bar of an ordinary mower with my invention attached, the top plate 46, shown in Fig. 5, being removed. Fig. 2 is a sectional view taken on line A B in Fig. 1, illustrating a device for severing the swath of cut vines from the uncut mass in the field which constitutes an important feature of my invention. Fig. 3 is a detailed elevation, being a side view of a vine-lifter, together with means for attaching the same to the finger-bar, and also showing one of the rearwardly-extending swath-removing prongs, more fully explained hereinafter. Fig. 4 is a bottom view of the parts shown in Fig. 3. Fig. 5 is a side view of the swath-removing attachment, taken from the direction of the wheeled portion of the machine.

Referring by numerals to the drawings, 6 and 7 represent the inner and outer shoes, respectively, and 8 the finger-bar, of an ordinary mower. Attached to the finger-bar and extending in front thereof are the vine-lifting shoes or runners 9, 10, 11, 12, and 13, a detailed side view of one of which is shown in Fig. 3.

In Fig. 3, 14 represents a casting adapted to fit over the common guard 15 on its under side, which casting is provided with a thimble 16 to engage the point of said guard 15, and a little farther rearward with the lugs 17, extending upward on either side of said guard and adapted to come into contact with the finger-bar 8. At its rear end it is turned up to a point on a plane with the finger-bar and is firmly held in position by means of the bolt 18, passing vertically through the clamp 19 and the slot 20 in the said casting. Within this clamping device is also retained the bar 21 in the rear of the finger-bar, which engages the swath-removing prongs. (Better shown in Fig. 1.) In Fig. 3 a hole 22 is shown in the rearward upturned portion of the casting 14. Where an equal number of the swath-removing prongs, as of the vine-lifting shoes, are used, these prongs may be connected by hooking their right-angled front ends into these holes, as shown at 23 in Fig. 4, thereby doing away with the connecting through a bar 21. (Shown in Fig. 1.)

At the front end of the casting 14 and in as close proximity to the thimble engaging the point of the guard to which it is connected as practicable is connected the vine-lifting shoe proper, 24. The joint 25 is so constructed that a certain upward-and-downward movement of the front point of the shoe 24 will be permitted, the object of this adjustability being to permit the point of the shoe always adapting itself to the physical character of the ground, thereby gathering up all the vines lying in its path instead of passing over those which lie in depressions in the ground, as would be the case were it stationary with respect to the finger-bar. While this joint is so constructed as to permit of the dropping of the shoe to any practicable distance, it is so arranged that its point may not rise quite to a level with the common guards, thereby causing the weight of finger-bar to rest on the runner or sole of the shoe at 26, pressing them tightly to the ground and at the same time causing the sickle to pass above and clear of the loose soil, which practice has demonstrated will clog into it and dull its cutting edges where the common guards are permitted to rest upon the ground in this class of mowing.

At the front extremity of the shoe is provided a vertical blade 27, which constitutes the point of the vine-lifter and is designed to cut slightly through the surface of the ground, thereby more certainly passing underneath the vines lying in its path. The point of the blade 27 may be brought down on a plane with the bearing part of the shoe at 26, or it may be constructed as shown in the drawings, allowing for the sinking of the shoe itself somewhat in the ground by reason of the vine-lifting shoes collectively having to support the weight of the finger-bar.

In operation the point 27 of the vine-lifter slides along the surface of the ground under the vines and the upwardly and rearwardly projecting arm 28 elevates them a sufficient distance from the ground to present their stalks to the action of the sickle and at the same time prevent the pea-pods from being cut and threshed by the same. The arm 28 is of such a length as to drop the cut vines to the rear of the finger-bar, or, as in case of my invention, to the disposition of the swath-removing apparatus. A plurality of these vine-lifters are always employed on the finger-bar—usually from four to six of them—so that their combined action will elevate the whole swath of vines intact in front of the sickle-bar and over it.

After a swath of entangled vines has been severed from the ground it next remains to separate this swath from the uncut mass in the field. This I accomplish by a new and simple means. From the entangled nature of ordinary pea-vines it has been found impracticable to sever a cut swath from the field mechanically in any other manner than by the action of a sickle or knife. This work of a seemingly extra sickle or cutting apparatus I accomplish with the regular finger-bar sickle in the following manner: At the outer end of the finger-bar I provide the forwardly-projecting and upturned shoe attachment 29, which practically forms a continuation of the outer shoe 7 of the finger-bar and may be connected to the same in various mechanical ways. In the drawings I have shown a construction which embodies the thimble 30, adapted to slip over the point of the shoe 7, and an arm 31, extending rearwardly and connected to the finger-bar. Constructed integrally therewith, as here shown, is a rearwardly-extending arm 32, which at its free end is inclined upward and in the direction of the wheeled portion of the machine, its object being to assist in the functions of the swath-removing apparatus. Equipped with this device as the finger-bar advances the shoe or runner 29 passes above the entangled mass of vines, conducting them below the sickle at this point, while the vine-lifter 9, which is placed on the second guard from shoe 7, passes underneath the mass of vines, elevating them above the sickle at this point, thereby exposing them to the intervening section of the sickle.

On the runner 29 I provide a wheel 33, the lower periphery of which projects somewhat below the sole of the said runner, the purpose of the wheel being to obviate friction between the vines and the runner and to assist in pressing the former down.

The forwardly-projecting bar 34 at the outer end of the finger-bar is a device which I use for mowing peas which stand up straight and have short vines, some species growing in this manner. It is hinged at 35 in the rear of the finger-bar, its forward point sliding along on the ground in front of the sickle-bar on a line with the outer shoe 7. It is provided at its front with an upwardly and inwardly extending knife 36. The object of this device is to divide the swath of vines from the field in advance of the finger-bar and it may be used in connection with the shoe attachment 29 in all kinds of mowing, or it may be dispensed with in mowing heavy entangled vines, or, again, it may be used as a substitute for the shoe attachment 29 in mowing short upstanding peas. The wheel or roller 37 is provided in order that any dragging vines may more readily release themselves. The wheel is elevated some distance above the ground, and the dragging of the longer end of the vines on the ground will cause the wheel to turn and release them by reeling them off.

The swath-removing device consists of the rearwardly-projecting arms or bars 38, 39, 40, 41, 42, 43, 44, and 45, connected to the rear of the finger-bar and graduating in length from the field toward the machine. At their free ends these bars are inclined upwardly and in the direction of the machine, the whole apparatus taking on a form something similar to that of the moldboard of a plow. After the cut mass of vines has been dropped from the points of the lifting shoes or guards 9, 10, 11, 12, and 13 it falls to the rear of the finger-bar onto the swath-removing apparatus. The friction of the vines on the ground between the bars 38, 39, 40, 41, 42, 43, 44, and 45 will allow the straight portion of the said bars to slide from beneath them until they are approached by the rearward curved portion of said bars, which will give them a rolling motion in the direction of the machine, the shorter bars, beginning with 38, delivering the mass to the next longer ones until the whole swath will be rolled and shoved off and left in a windrow in the rear of the machine. The straight portion of these bars, as well as also a part of the curved portion of the bars, is designed to slide on the surface of the ground in order that the cut vines may sag between them and come into contact with the ground, thereby giving them a pulling tendency against the curved portion of the same.

I am aware that it is not wholly new to construct a swath-removing apparatus with rearwardly-extending arms; but heretofore in the construction of these devices there has been no attempt to remove the swath farther in the direction of the machine than on a line with the inner shoe of the finger-bar. In the case of an ordinary mower this does not remove the swath a sufficient distance to make room for the next passage of team and machine.

By means of my invention the swath may be removed any desired distance beyond this by increasing the length and lateral curvature of the longer bars 45 44 43, &c. In the ordinary construction, as shown in Fig. 1, I connect these bars to the finger-bar by means of the cross-bar 21, which is held in place by means of the clamps 19$^a$ 19$^b$, &c. (Shown in Fig. 1.) This bar 21 is made in the form of a trough, a cross-section of which is shown in Fig. 5, with openings in the top of the rear upright edge to receive the bars 38 39, &c., the ends of which terminate in right angles, the angled portion lying within the trough or hollow bar 21. After placing these bars in place a top plate or cap 46, as shown in Fig. 5, is secured on the top of the bar 21, which serves to hold the prongs in place, the connection being such as to allow of considerable independent motion of the rear free ends of the said prongs in an upward and downward direction.

Having thus described my invention, what I claim is—

1. An attachment for the finger-bars of mowers and harvesters consisting of the forwardly-extending vine-lifting shoes provided with a vertical blade 27 at their forward point said shoes connected to the finger-bar and provided with the joint 25 adapted to permit the forward point of the said shoe to adapt itself to the physical character of the ground, the said point and the bearing-surface of the shoe when at its upper extremity being retained on a line a little below the common finger-bar guards substantially as and for the purposes set forth.

2. An attachment for the finger-bars of mowers and harvesters consisting of the bar 34, hinged in the rear outer end of the finger-bar terminating in a point at its front end and provided with the upwardly and inwardly projecting knife 36; substantially as and for the purposes set forth.

3. An attachment for the finger-bars of mowers and harvesters consisting of the wheel 33, connected to the outer shoe of the finger-bar by means of the casting 32 adapted to engage the forward point of the said outer shoe at 30, the lower periphery of said wheel being adapted to conduct the vines, or other entangled mass being mowed, below the point of the said shoe substantially as and for the purposes set forth.

In testimony that I claim the foregoing I have hereunto set my hand, at Manitowoc, in the county of Manitowoc and State of Wisconsin, in the presence of two witnesses.

WILLIAM GATERMAN.

Witnesses:
H. L. MARKHAM,
E. J. ONSTAD.